US012064651B2

(12) United States Patent
Orofino et al.

(10) Patent No.: US 12,064,651 B2
(45) **Date of Patent: *Aug. 20, 2024**

(54) FILTER MASK HAVING ONE OR MORE MALLEABLE STIFFENING MEMBERS

(71) Applicant: Crosstex International, Inc., Hauppauge, NY (US)

(72) Inventors: Richard Allen Orofino, Northport, NY (US); Lou Carbone, Old Brookville, NY (US); Mitchell Victor Steinberg, Oyster Bay Cove, NY (US); Andrew Guy Whitehead, Hauppauge, NY (US); Matthew Conlon, Caldwell, NJ (US)

(73) Assignee: Crosstex International, Inc., Des Plaines, IL (US)

(*) Notice: Subject to any disclaimer, the term of this patent is extended or adjusted under 35 U.S.C. 154(b) by 578 days.

This patent is subject to a terminal disclaimer.

(21) Appl. No.: 16/889,203

(22) Filed: Jun. 1, 2020

(65) Prior Publication Data

US 2020/0298031 A1 Sep. 24, 2020

Related U.S. Application Data

(62) Division of application No. 13/819,140, filed as application No. PCT/US2011/049690 on Aug. 30, 2011, now Pat. No. 10,668,308.

(Continued)

(51) Int. Cl.

*A62B 23/02* (2006.01)
*A41D 13/11* (2006.01)

(Continued)

(52) U.S. Cl.

CPC ........ *A62B 23/025* (2013.01); *A41D 13/1115* (2013.01); *A41D 13/1161* (2013.01);

(Continued)

(58) Field of Classification Search

CPC ...... A41D 13/11–1192; A41D 2400/00; A41D 2400/42; A62B 23/00–025; A62B 18/00;

(Continued)

(56) References Cited

U.S. PATENT DOCUMENTS

| | | | | |
|---|---|---|---|---|
| 2,081,779 A * | 5/1937 | Titus | .................. | A41D 13/1192 128/206.16 |
| 3,971,369 A | 7/1976 | Aspelin et al. | | |

(Continued)

FOREIGN PATENT DOCUMENTS

| | | |
|---|---|---|
| CN | 201543133 U | 8/2010 |
| JP | 08155046 A | 6/1996 |

(Continued)

OTHER PUBLICATIONS

European Search Report dated May 22, 2014 of European Application No. 11822474.0-1401/2611315 filed Aug. 30, 2011, which is based on PCT/US2011/049690.

(Continued)

*Primary Examiner* — Michelle J Lee

(74) *Attorney, Agent, or Firm* — Sorell, Lenna & Schmidt, LLP

(57) ABSTRACT

A filter mask for filtering air inhaled and exhaled from the mouth and nostrils while providing a secure fit and comfort to the wearer is provided. The filter mask has upper and lower edges which are provided with at least one malleable stiffener for conforming to the shape of the wearer's nose and cheek area and/or the lower jaw and chin area. In some embodiments, the filter masks further comprises a malleable stiffening member configured to conform the filter material to at least a chin portion and a jaw portion of the face. In some embodiments, the malleable stiffener can have a bend portion, which allows the wearer of the mask to know which part, center and side of the mask is to be properly placed on (Continued)

the nose and cheek area. The masks provide excellent filtration and provide a secure and comfortable fit to the wearer.

16 Claims, 10 Drawing Sheets

Related U.S. Application Data

(60) Provisional application No. 61/378,585, filed on Aug. 31, 2010.

(51) Int. Cl.
*A62B 18/02* (2006.01)
*A62B 18/08* (2006.01)

(52) U.S. Cl.
CPC ............ *A62B 18/025* (2013.01); *A62B 18/08* (2013.01); *A41D 2400/42* (2013.01)

(58) Field of Classification Search
CPC ... A62B 18/02–025; A62B 18/08; A62B 7/00; A62B 7/10
See application file for complete search history.

(56) References Cited

U.S. PATENT DOCUMENTS

| | | | | |
|---|---|---|---|---|
| 5,020,533 | A | 6/1991 | Hubbard et al. | |
| 5,467,765 | A | 11/1995 | Maturaporn | |
| 5,558,089 | A | 9/1996 | Castiglione | |
| 5,699,791 | A * | 12/1997 | Sukiennik | A41D 13/1161 128/206.13 |
| 6,070,578 | A * | 6/2000 | Baughman | A41D 13/1192 128/205.27 |
| 6,336,459 | B1 * | 1/2002 | Miyake | A41D 13/1123 128/857 |
| 7,036,507 | B2 * | 5/2006 | Jensen | A41D 13/1115 128/206.13 |
| 7,069,930 | B2 | 7/2006 | Bostock et al. | |
| 7,210,482 | B2 * | 5/2007 | Huang | A62B 23/025 128/206.13 |
| 7,290,545 | B2 | 11/2007 | Kleman et al. | |
| 7,390,760 | B1 | 6/2008 | Chen et al. | |
| 7,766,015 | B2 | 8/2010 | Harold et al. | |
| 8,061,356 | B2 | 11/2011 | Bowen | |
| 8,303,693 | B2 | 11/2012 | Leung | |
| 8,622,059 | B2 | 1/2014 | Kleman | |
| 9,012,013 | B2 | 4/2015 | Duffy | |
| 10,668,308 | B2 * | 6/2020 | Orofino | A62B 18/025 |
| 2004/0099677 | A1 | 5/2004 | Harris et al. | |
| 2005/0098180 | A1 | 5/2005 | Lien et al. | |
| 2006/0094320 | A1 | 5/2006 | Chen et al. | |
| 2007/0175477 | A1 | 8/2007 | Baggett | |
| 2008/0160856 | A1 | 7/2008 | Chen et al. | |
| 2008/0264258 | A1 | 10/2008 | Mares et al. | |
| 2008/0264259 | A1 | 10/2008 | Leung | |
| 2009/0084384 | A1 | 4/2009 | Cheng et al. | |
| 2009/0255535 | A1 | 10/2009 | Kanzer | |
| 2010/0095967 | A1 | 4/2010 | Bostock et al. | |
| 2011/0259813 | A1 | 10/2011 | Wertz et al. | |
| 2011/0271955 | A1 | 11/2011 | Palomo et al. | |
| 2012/0111344 | A1 | 5/2012 | Goranov et al. | |
| 2012/0272967 | A1 | 11/2012 | Stewart | |
| 2012/0272973 | A1 | 11/2012 | Palomo et al. | |
| 2012/0312734 | A1 | 12/2012 | Kalayci et al. | |

FOREIGN PATENT DOCUMENTS

| | | |
|---|---|---|
| JP | H08155046 A | 6/1996 |
| JP | 2005152030 A | 6/2005 |
| JP | 3117121 U | 1/2006 |
| WO | 2011151314 | 12/2011 |
| WO | 2012097762 | 7/2012 |

OTHER PUBLICATIONS

PCT International Search Report dated Dec. 22, 2011 of International PCT Application No. PCT/US2011/049690 filed Aug. 30, 2011.
Written Opinion of the International Searching Authority dated Dec. 22, 2011 of International PCT Application No. PCT/US2011/049690 filed Aug. 30, 2011.

* cited by examiner

FILTER MASK HAVING ONE OR MORE MALLEABLE STIFFENING MEMBERS

This application claims the benefit of the filing date of Provisional Application No. 61/378,585, filed Aug. 31, 2010, entitled "A Filter Mask Having One Or More Malleable Stiffening Members." This entire disclosure is hereby incorporated by reference into the present disclosure.

BACKGROUND

Recently, there has been great interest in different ways to reduce the risk of infection not only in nursing homes, hospitals and hospices throughout the nation, but also in the doctor's and dentist's office, as well as in non-healthcare settings such as businesses, offices, schools and other places where people congregate. The healthcare and non-healthcare environments contain a diverse population of microorganisms, which can cause infection. Microorganisms (e.g., bacteria, fungi, yeast, molds and viruses) in air and water, on surfaces, on skin, in bodily fluid (e.g., blood, saliva, secretions, wound exudate, etc.), and other sources tend to be the biggest players in the spread of infection. Not only are patients at risk of developing infection, but also are the visitors, nurses, doctors, or other healthcare and non-healthcare workers that come into contact with these infectious sources.

Medical knowledge and public awareness of ways in which infections are transmitted is helping to reduce spread of infections. Infection prevention and control procedures involving universal precautions such as hand washing, wearing gloves, gowns, filter masks and other protective equipment and covering open wounds has also helped reduced the spread of infections.

Unfortunately, when it comes to filter masks, healthcare and non-healthcare workers often do not wear the mask properly on the nose, cheek, lower jaw and chin areas. Sometimes the healthcare and non-healthcare workers will even wear the mask inside out or upside down, which results in a poor fit and gaps in the filter mask leading to potential risk of exposure for themselves and others to microorganisms that cause infections.

Many healthcare and non-health care workers alike at times complain that conventional filter masks are uncomfortable and often do not remain in position during use. This may lead to a poor fit and further discomfort to the wearer.

Therefore, there is a need for a filter mask which overcomes the problems of conventional filter masks and provides for a comfortable and better fit over a wider range of facial sizes and shapes. Filter masks that help the user properly wear the mask to reduce potential risk of contamination to the wearer and others are still needed.

SUMMARY

The new filter masks provided allow a comfortable and better fit over a wider range of facial sizes and shapes. The filter masks are light weight and may be stored in a folded configuration.

By including a bend portion (e.g., crimp) in a malleable stiffening member (e.g., metal strip) of the filter masks, the user can properly identify the front, back, nose and cheek area of the mask, and properly wear the mask to reduce potential risk of contamination and effectively filter either inhaled or exhaled air from the nostrils or the mouth of the wearer.

In some embodiments, by including a malleable stiffening member (e.g., metal strip) in the nose portion and the chin portion of the filter mask, the user can pinch the malleable stiffening members to obtain a secure and comfortable fit to the mask and, therefore, have the mask custom fit to his/her face.

In some embodiments, there is a filter mask, which provides a secure fit and reduces leakage of material around the top, bottom and edges of the masks. In some embodiments, the filter mask provided exhibits a high bacterial filtration efficiency while it resists collapsing on the mouth of the wearer that may cause discomfort.

In one embodiment, a filter mask is provided comprising: a filter material having an inner surface to be worn against a wearer's face, the filter material comprising at least one pleat for folding and unfolding the filter material such that when folded the filter material assumes a generally flat storage configuration having upper, lower and side edges and such that when unfolded the filter material forms a mask configured to cover the nose and mouth of the wearer, the at least one pleat disposed between at least the upper and lower edges and configured to fit over a chin of the wearer when unfolded; a malleable stiffening member attached to or within the filter material proximate to the upper edge, the malleable stiffening member configured to conform the filter material to at least a nose portion and a cheek portion of the face of the wearer, the malleable stiffening member having a bend portion indicating at least the inner surface and the nose portion of the filter mask; and a securing means for securing the filter material to the wearer's face.

In another embodiment, a filter mask is provided comprising: a filter material having an inner surface to be worn against a wearer's face, and an outer surface, the filter material comprising at least one pleat for folding and unfolding the filter material such that when folded the filter material assumes a generally flat storage configuration having upper, lower and side edges and such that when unfolded the filter material forms a mask configured to cover the nose and mouth of the wearer, the at least one pleat disposed between the upper, lower and side edges and configured to fit over a chin of the wearer and to provide a breathing chamber when unfolded; a first malleable stiffening member attached to or within the filter material proximate to the upper edge, the first malleable stiffening member configured to conform the filter material to at least a nose portion and a cheek portion of the face of the wearer, the malleable stiffening member having a bend portion indicating at least the outer surface and the nose portion of the filter mask; a second malleable stiffening member attached to or within the filter material proximate to the lower edge, the second malleable stiffening member configured to conform the filter material to at least a chin portion and a jaw portion of the face of the wearer; and a securing means for securing the filter material to the wearer's face.

In yet another embodiment, a stack of filter masks is provided comprising: a plurality of filter masks, each filter mask comprising a filter material having an inner surface to be worn against a wearer's face, and an outer surface, the filter material comprising at least one pleat for folding and unfolding the filter material such that when folded the filter material assumes a generally flat storage configuration having upper, lower and side edges and such that when unfolded the filter material forms a mask configured to cover the nose and mouth of the wearer, the at least one pleat disposed between the upper, and lower edges and configured to fit over a chin of the wearer when unfolded; a malleable stiffening member attached to or within the filter material proximate to the upper edge, the malleable stiffening member configured to conform the filter material to at least a nose portion and a cheek portion of the face of the wearer, the malleable stiffening member having a bend portion indicating a least the outer surface and the nose portion of the filter mask; a securing means for securing the filter material to the wearer's face; and wherein the masks are positioned in a nestled relation to one another, the inner surface of at least one mask being apposed to the outside surface of an adjacent mask, thereby forming a stack.

In still yet another embodiment, there is a method of making a filter mask having a bend portion, the method comprising providing a filter material having an inner surface to be worn against a wearer's face, the filter material comprising at least one pleat for folding and unfolding the filter material such that when folded the filter material assumes a generally flat storage configuration having upper, lower and side edges and such that when unfolded the filter material forms a mask configured to cover the nose and mouth of the wearer, the at least one pleat disposed between at least the upper and lower edges and configured to fit over a chin of the wearer when unfolded; inserting a malleable stiffening member or attaching it to at least the inner surface or outer surface and the nose portion of the filter mask to indicate at least the inner surface or outer surface and the nose portion of the filter mask; bending, folding, creasing, crimping, punching, etching, or angling the malleable stiffening member, and attaching a securing means to the filter material.

In still yet another embodiment, a filter mask is provided comprising a filter material having an inner surface to be worn against a wearer's face, the filter material comprising at least one pleat for folding and unfolding the filter material such that when folded the filter material assumes a generally flat storage configuration having upper, lower and side edges and such that when unfolded the filter material forms a mask configured to cover the nose and mouth of the wearer, the at least one pleat disposed between at least the upper and lower edges and configured to fit over a chin of the wearer when unfolded; a malleable stiffening member attached to or within the filter material proximate to the upper edge, the malleable stiffening member configured to conform the filter material to at least a nose portion and a cheek portion of the face of the wearer, a second malleable stiffening member attached to or within the filter material proximate to the lower edge, the second malleable stiffening member configured to conform the filter material to at least a chin portion and a jaw portion of the face of the wearer, the second malleable stiffening member being smaller in length than the malleable stiffening member.

In one exemplary embodiment, a method of wearing a filter mask is provided, the method comprising: providing a filter mask to a wearer and conforming the malleable stiffening member to at least a nose portion and a cheek portion of the face of the wearer, the malleable stiffening member having a bend portion indicating at least the inner surface and the nose portion of the filter mask; and securing the filter mask to the wearer's face.

In another exemplary embodiment, a method of wearing a filter mask is provided, the method comprising: providing a filter mask to a wearer; conforming the first malleable stiffening member to at least a nose portion and a cheek portion of the face of the wearer, the malleable stiffening member having a bend portion, which is bent, creased, folded, or angled away from the inner surface that indicates at least the outer surface and the nose portion of the filter mask; conforming the second malleable stiffening member to at least a chin portion and a jaw portion of the face of the wearer, and securing the filter mask to the wearer's face.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

Figure 1:
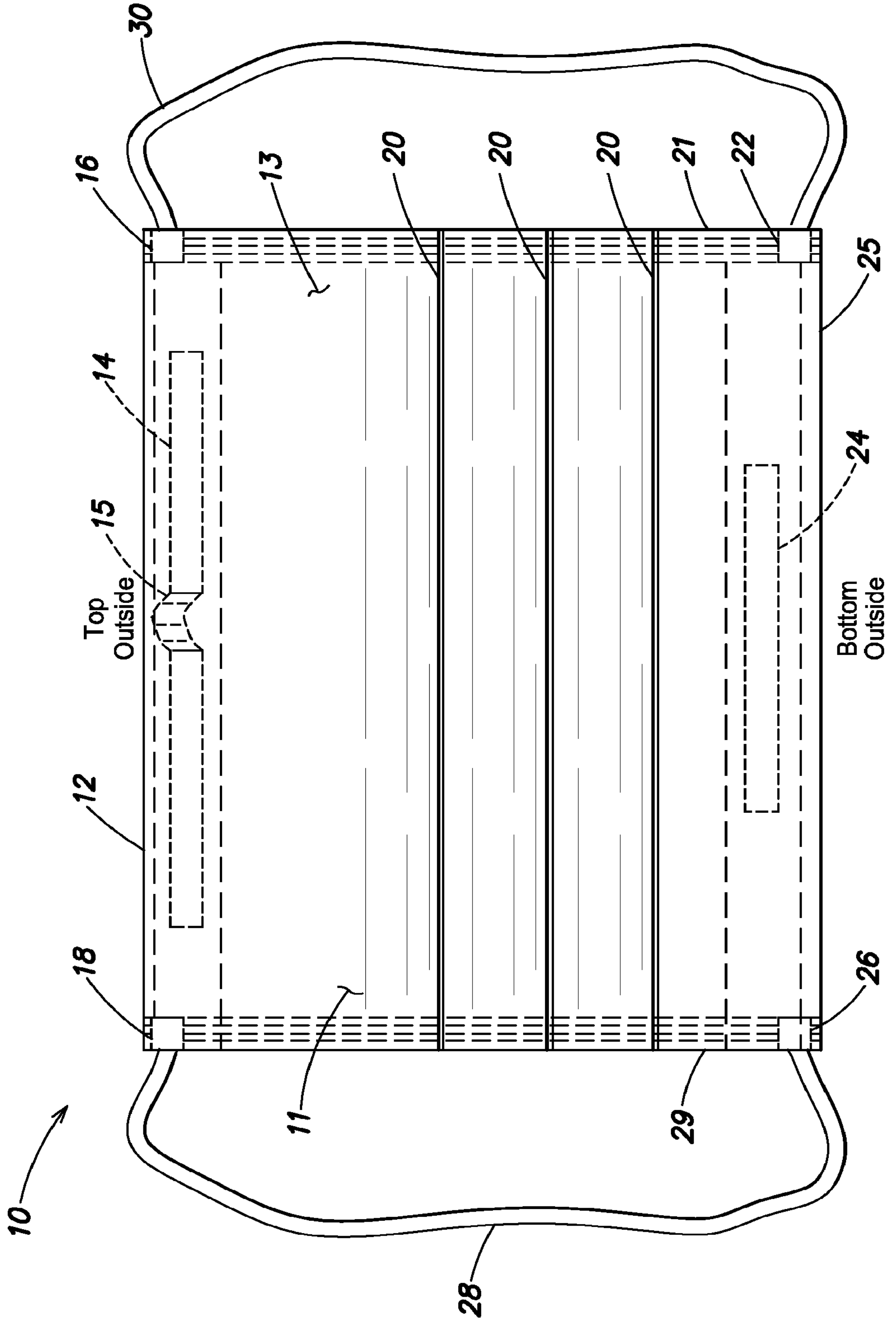
FIG. 1 illustrates an embodiment of an outside sectional view of the filter mask in a folded configuration prior to the filter mask being installed upon a wearer's face. The bend portion or crimp causes a projection or peak visible from the outside of the mask and a recesses or trough visible from the inside of the mask that the wearer places against the face.

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

It is noted that, as used in this specification and the appended claims, the singular forms "a," "an," and "the," include plural referents unless expressly and unequivocally limited to one referent. Thus, for example, reference to "a malleable stiffening member" includes one, two or more malleable stiffening members.

Reference will now be made in detail to certain embodiments of the invention, examples of which are illustrated in the accompanying drawings. While the invention will be described in conjunction with the illustrated embodiments, it will be understood that they are not intended to limit the invention to those embodiments. On the contrary, the invention is intended to cover all alternatives, modifications, and equivalents, which may be included within the invention as defined by the appended claims.

The headings below are not meant to limit the disclosure in any way; embodiments under any one heading may be used in conjunction with embodiments under any other heading.

Filter Mask

FIG. 1 illustrates an embodiment of an outside sectional view of the filter mask 10 in a folded configuration 11 prior to the filter mask being installed upon a wearer's face. In the view shown, this side of the filter mask 10 would face the outside environment and not touch the wearer's nose, cheeks, jaw and/or chin. The filter mask 10 may have application in medical, industrial, domestic, or other circumstances. The embodiment shown is an N95 respirator, which is a lightweight, nose-and-mouth respirator that provides protection for the wearer from microorganisms (e.g., bacteria, fungi, yeast, molds and viruses).

The filter mask 10 is generally configured so as to provide a secure fit which reduces or prevents gaps and passage of material between the nostrils and mouth and the surrounding environment except through the filter material 13. The makeup of the filter material 13, and the pleating 20 used in connection with the filter mask 10 will be explained in detail shortly. The filter mask 10 has the particular advantage of allowing a secure fit to be created and to be maintained upon installation of the filter mask 10 on the face with the use of two ear loops 28 and 30.

The filter mask 10 may be constructed of a wide variety of materials and is preferably disposable. The filter material 13 used to fabricate the filter mask 10 may vary according to the particular application of the filter mask 10. For example, when the filter mask 10 is to be used in a medical application, such as on members of a surgical team, it is common to use a three layer filter material. However, appropriate filter materials may be of a single or multiple layer design. Multi-layer material may be readily purchased in a precollated form, that is with the three layers already arranged, or the materials may be obtained separately and the filter material 13 formed in part of the process for forming the filter mask 10.

Generally, a three or four layer filter medium might include an outer layer of a relatively porous paper-like material which provides durability and resistance against abrasion. The outer layer may also be generally stiffer than the other layers. By using a stiffer outer layer, the effectiveness of the various pleating arrangements is increased. The pleats 20 are disposed between the upper edge 12 and lower edge 25 and side edges 21 and 29 and may be incorporated in the body of the filter material 13 to hold the filter mask 10 in a cup-like shape when installed. The middle layer or layers of the filter material generally contain polyethylene or polypropylene, or other material, which exhibits the proper filtration characteristics. Glass fiber based materials may also have applications as the middle filtration layer. The innermost layer of the filter material to be worn next to or against the face generally comprises a soft material for providing a soft, non-irritating surface against which the facial skin will make contact.

In medical, dental and/or surgical applications, it is generally important that the filter material 13 also provide a high bacterial filtration efficiency (BFE). The BFE of a filter material is generally determined by the percentage of bacteria, such as *Staphylococcus aureus* or *Bacillus stearothermophilus*, that is able to migrate through the filter material under normal conditions. The fewer bacteria which are able to pass through the filter material 13, the higher the BFE. Of course, a BFE of 100% is desirable; however, efficiencies of as low as 25% are not uncommon among some types of prior art disposable filter masks. However, materials are available which provide BFE's of between 90 and 99%. Thus, in a medical, dental and/or surgical environment it is generally desirable to utilize a filter material having as high a BFE as possible so as to prevent release of nasopharyngeal organisms into the environment. In general, the considerations that provide for a high BFE are the same considerations which provide that a filter material would be desirable in applications in industry and domestic use. For example, a filter material which inhibits the migration of nearly all bacteria would generally also prevent inhalation of dust and dirt particles in industrial applications. Furthermore, it has generally been found that those materials providing a high BFE are often also those materials which provide the least resistance to passage of gases through the filter material.

The passage of gases through the filter material is important in maintaining the comfort of the wearer. It should be realized by one of ordinary skill in the art, however, that many applications might require greater or lesser standards of filtration than is commonly required in the medical environment. Therefore, while filter materials having an efficiency suitable for use with the present application available in the art, the best filter material is of little use if the air inhaled and exhaled by the wearer is allowed to escape the filter mask 10 without passing through the filter material 13. Indeed, the lack of a secure fit in the filter masks available in the prior art is important to the design and fabrication of filter masks. Therefore, the present application provides a unique secure fit which reduces or prevents inhaled and exhaled air from leaking around the edges 12, 25, 21, and 29 of the filter mask 10, all while providing a superior fit on a wider range of facial sizes and shapes. The maintenance of such a secure fit greatly improves the overall efficiency of the filter mask 10.

The structure of the filter mask 10 is generally prepared as a rectangular piece of flat filter material 13. However, it will be understood by those of ordinary skill in the art that other shapes of the filter mask can be made in order to cover additionally both the eyes, hair, and throat of the user. As such, the present application includes filter masks 10 that cover areas above and beyond simply the nose and mouth of the user. The filter mask may also incorporate any combination of known filter mask 10 features, such as visors or shields, sealing films, beard covers, etc. In some embodiments, the filter mask 10 may be from about 5.5 inches to 7 inches across in length to cover the user's nose and mouth. In FIG. 1, the mask is shown as it would be packaged in its folded and flat configuration, where the outside surface is viewed.

The filter mask 10 comprises a malleable stiffening member 14 attached to or imbedded in the filter material 13 at the masks upper edge 12. The malleable stiffening member 14 is configured to conform the filter material 13 to at least a nose portion and a cheek portion of the face of the wearer.

A second malleable stiffening member 24 is attached to or within lower edge 25 of the filter material 13, as illustrated in FIG. 1. The second malleable stiffening member is configured to conform the filter material to at least a chin portion and a jaw portion of the face of the wearer. In some embodiments, the second malleable member does not include a bend portion. In other embodiments, it can include a bend portion that is different from the bend portion 15 in the nose and cheek portion of the mask provided that they can be distinguished (e.g., the bend portion 15 at the nose section can be creased at a larger angle than the optional bend portion in the chin piece).

It should be understood that the use of the term "malleable stiffener" or "malleable stiffening member" herein is meant to include the use of both malleable and flexible stiffeners. It is preferred that the malleable stiffeners 14, and 24 be placed adjacent to the upper 12 and lower edges 25 of the filter material 13, respectively. Alternatively, the malleable stiffeners 14, and 24 may be placed somewhere along the upper 12 and lower edges 25 of the filter material 13. The important property of the malleable stiffeners 14 and 24 is that the material be pliant enough to be bent to a shape that conforms to the face of the wearer, and then retain that shape. In this regard, it is important that the malleable stiffeners 14 and 24 not be too stiff so as to make it difficult for the wearer to conform the filter mask 10 upon installation. The filter mask 10 also has ear loop 30 attached to edges of the mask at attachment points 16 and 22 and ear loop 28 to edges of the mask at attachment points 18 and 26 used in donning the mask. In the embodiment shown in FIG. 1, the ear loops are attached to the outside surface of the mask. However, it will be understood by those of ordinary skill in the art that the loops can be attached to the inside surface of the mask.

Generally, as used herein, the upper portion (33 in FIG. 3) of the filter mask 10 will refer to that portion which contacts the nose and cheek areas of the wearer while the lower portion (40 in FIG. 3) of the filter mask 10 will be that portion which is in proximity to the lower jaw and chin of the wearer. The malleable stiffeners 14 and 24 can comprise any pliant material, such as a malleable metal or alloy, plastic, or the like. In some embodiments, the malleable stiffeners comprise aluminum or other binding material which exhibits stiffening characteristics.

The malleable stiffeners 14 and 24 can be attached to or imbedded within the inside or outside surface of the filter material. In some embodiments, the malleable stiffening members can be attached to the filter mask and then covered with the same or different material used to make the mask. For example, the malleable stiffening members can be attached to the mask by covering it with spunbonded polypropylene and ultrasonically sealing it to the outer surface of the mask. In some embodiments, the malleable stiffening members can be attached to the mask by adhesive or other means for holding the malleable stiffening members to the mask.

In some embodiments, first malleable stiffener 14 used for the nose portion of the mask may be from about 3 to 6 inches in length and from about 0.025 or 0.125 or 0.25 or 0.5 inches in height and from about 0.01 or 0.02 or 0.05 or 0.125 or 0.25 inches thick.

In some embodiments, second malleable stiffener 24 used for the chin portion of the mask may be from about 1.5 to 5 inches in length and from about 0.025 or 0.125 or 0.25 or 0.5 inches in height and from about 0.01 or 0.02 or 0.05 or 0.125 or 0.25 inches thick. In some embodiments, the first malleable stiffener 14 used in the nose portion is a length that is larger or the same size as the length of second malleable stiffener 24 that is used in the chin portion of the filter mask. In some embodiments, the second malleable stiffener 24 is smaller than the first malleable stiffener 14.

In one exemplary embodiment, a method of wearing a filter mask is provided, the method comprising: providing a filter mask to a wearer and conforming the malleable stiffening member to at least a nose portion and/or a cheek portion of the face of the wearer, the malleable stiffening member having a bend portion indicating at least the inner surface and the nose portion of the filter mask; and securing the filter mask to the wearer's face. The user takes his/her fingertips and applies suitable pressure and bends the malleable stiffening member to conform it to the nose portion and/or cheek portion of the wearer. Thus, the malleable stiffening member is sized, has a length and thickness that allows it to be bent and conform to the nose portion and/or cheek portion of the wearer and a corresponding portion of the mask conforms to the nose portion and/or cheek portion of the wearer as well.

In another exemplary embodiment, a method of wearing a filter mask is provided, the method comprising: providing a filter mask to a wearer; conforming the first malleable stiffening member to at least a nose portion and/or a cheek portion of the face of the wearer, the malleable stiffening member having a bend portion, which is bent, creased, folded, or angled away from the inner surface that indicates at least the outer surface and the nose portion of the filter mask; conforming the second malleable stiffening member to at least a chin portion and/or a jaw portion of the face of the wearer, and securing the filter mask to the wearer's face. The user takes his/her fingertips and applies suitable pressure and bends the first malleable stiffening member to conform it to the nose portion and/or cheek portion of the wearer. Thus, the first malleable stiffening member is sized, has a length and thickness that allows it to be bent and conform to the nose portion and/or cheek portion of the wearer and a corresponding portion of the mask contacting the first malleable stiffening member conforms to the corresponding nose portion and/or cheek portion of the wearer as well. For the second malleable stiffening member, the user takes his/her fingertips and applies suitable pressure and bends the second malleable stiffening member to conform it to the chin portion and/or jaw portion of the wearer. Thus, the second malleable stiffening member is sized, has a length and thickness that allows it to be bent and conform to the chin portion and/or jaw portion of the wearer and a corresponding portion of the mask contacting the second malleable stiffening member conforms to the corresponding chin portion and/or jaw portion of the wearer as well.

Bend Portion

The malleable stiffening member 14 has a bend portion 15 indicating at least the inner surface, outer surface, center and/or the nose portion of the filter mask. The bend portion or crimp includes an angular or rounded shape made by pinching, folding, punching or bending the malleable stiffening member 14 to cause a cavity, indentation, recess, crease, or trough on the inside surface of the mask (not shown) and a projection, peak, protrusion, elevation or ridge on the outside surface of the mask (shown). In some embodiments, the bend portion 15 includes making a ridge or fold by pinching the malleable stiffening member 14 by hand or machine. Although the bend portion 15 is shown generally in the center of the malleable stiffening member 14, it will be understood that the bend portion 15 can be disposed to the left, or right of center.

The bend portion 15 or crimp may be located by the nose portion of the mask on the outer or inner surface and be angled or crimped in the direction away from the nose so that the user can bend it further for a custom fit around the nose and check area. In this way, the bend portion can be "pre-bent" or "pre-crimped" by the manufacturer. Accordingly, the bend portion will cause the inner surface of the mask that is to be placed against the user's nose to have a cavity, indentation, recess, crease, or trough on the inside surface of the mask and as the malleable stiffening member 14 is further pinched, bent or folded (as shown by the arrows in FIG. 2A), a cavity, indentation, recess, crease, or trough becomes larger to accommodate the nose. In this way, the user will have a visual indication of where the top of the mask is, where the nose section of the mask is and/or where the center of the mask is for those embodiments where the bend portion is disposed within the center or generally within the center of the malleable stiffening member 14. In some embodiments, the bend portion 15 allows the user to identify the outside of the mask, the inside of the mask, top of the mask, and/or center of the mask. In some embodiments, the bend portion 15 is packaged (not shown) at least partially bent so that the cavity, indentation, recess, crease, or trough is visible on the interior of the mask.

The bend portion 15 or crimp is typically formed from the same material as the malleable stiffening member. However, the same or different material may be used as long as the bend portion will cause a crease or fold in the filter material and allow the user to identify the top, center, inside and/or outside of the mask. The bend portion may be formed from any suitable material, such as an elastic material (e.g. a polymer), inelastic material, a nonwoven, knit, ribbon, cloth, wire, metal or the like.

In some embodiments, the bend portion may be bent before use by the manufacturer by about 1 to about 5 degrees, by about 1 to about 10 degrees, or by about 5 to about 20 degrees. In some embodiments, the bend portion may be bent before use by the manufacturer so that the bend portion projects out of the inner or outer surface of the mask by about 0.25 mm to about 0.5 mm, or by about 1 mm to about 5 mm or by about 1 mm to about 10 mm or by about 5 mm to about 20 mm, or by about 10 mm to about 30 mm or by about 35 mm to about 60 mm. In some embodiments, the bend portion is designed for easy bending around the ridge of the nose. In some embodiments, the bend portion, like the malleable stiffening member, may be substantially deformable so that a wearer is able to bend, pinch or fold the bend portion and/or the malleable stiffening member between two or more fingers when gripping it as it is put around the ridge of the nose.

The bend portion 15, since it provides space between adjacent masks, allows the filter mask 10 to be stacked for easy packaging and dispensing of a plurality of masks. In some embodiments, a stack of filter masks is provided comprising: a plurality of filter masks, each filter mask comprising a filter material having an inner surface to be worn against a wearer's face, and an outer surface, the filter material comprising at least one pleat for folding and unfolding the filter material such that when folded the filter material assumes a generally flat storage configuration having upper, lower and side edges and such that when unfolded the filter material forms a mask configured to cover the nose and mouth of the wearer, the at least one pleat disposed between the upper, and lower edges and configured to fit over a chin of the wearer when unfolded; a malleable stiffening member attached to or within the filter material proximate to the upper edge, the malleable stiffening member configured to conform the filter material to at least a nose portion and a cheek portion of the face of the wearer, the malleable stiffening member having a bend portion indicating at least the outer surface and the nose portion of the filter mask; a securing means for securing the filter material to the wearer's face; and wherein the masks are positioned in a nestled relation to one another (e.g., masks that are close or one on top of the other in the package), the inner surface of at least one mask being apposed to the outside surface of an adjacent mask, thereby forming a stack.

Figure 2A:
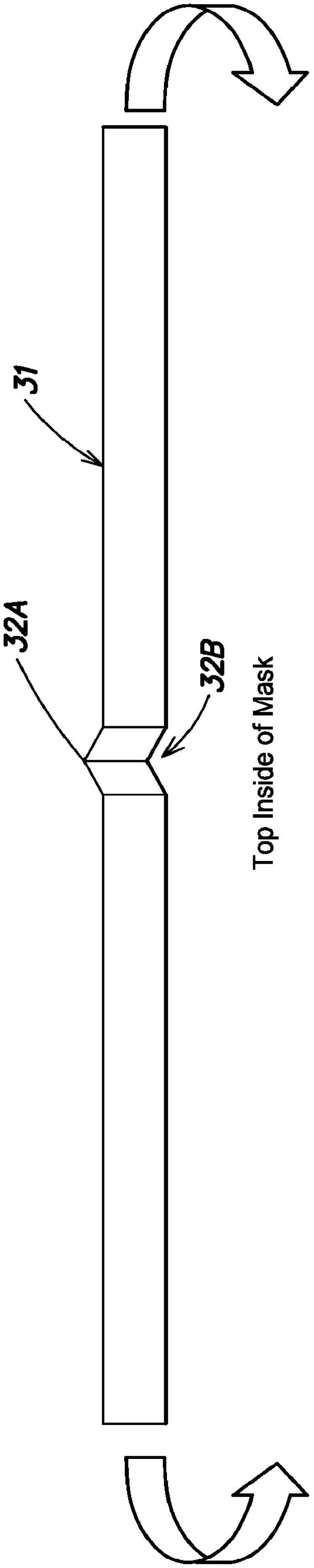
FIG. 2A illustrates an embodiment of a top view of the malleable stiffening member (e.g., metal strip) having a bend portion shown as a crimp or crease that causes a recess or trough or cavity visible from the inside of the mask in the nose section.

FIG. 2A illustrates a top side view of the malleable stiffening member 31 (e.g., metal strip) having a bend portion shown as a crimp or crease. The bend portion has a projection, peak, protrusion, elevation or ridge 32A that extends out and is visible on the outside surface of the mask (not shown). The bend portion has a cavity, indentation, recess, crease, or trough 32B on the inside of the mask that is visible on the inside surface of the mask. The stiffening member 31 would have this configuration when attached to the mask. The mask would be in a flat and/or folded configuration. In the embodiment, shown the bend portion, like the malleable stiffening member 31, may be substantially deformable so that a wearer is able to bend or fold the bend portion and/or the malleable stiffening member in the direction of the arrows shown using two or more fingers when gripping it as it is put around the ridge of the nose.

By employing a bend portion in the malleable stiffening member 31, which is placed in the center of the filter mask, the wearer will see a projection, peak, protrusion, elevation, or ridge or other marker visible on the outside surface of the mask, or a cavity, indentation, recess, crease, or trough or other marker visible on the inside surface of the mask and know where the top inside or outside, and/or center of the mask is and where the nose portion of the mask is to be placed on the face. It will be understood by those of ordinary skill in the art that the bend portion can be any shape (e.g., regular, irregular, symmetrical or asymmetrical shape).

In some embodiments, the bend portion causes a projection, peak, protrusion, elevation, or ridge or other marker on the top front, outside and/or center portion of the mask so that the wearer will know these portions of the mask and know the right side of the mask should be facing the outside environment and not the wearer's nose or face. In this way, the filter mask of the present application reduces the risk that the wearer will wear the mask incorrectly.

Figure 2B:
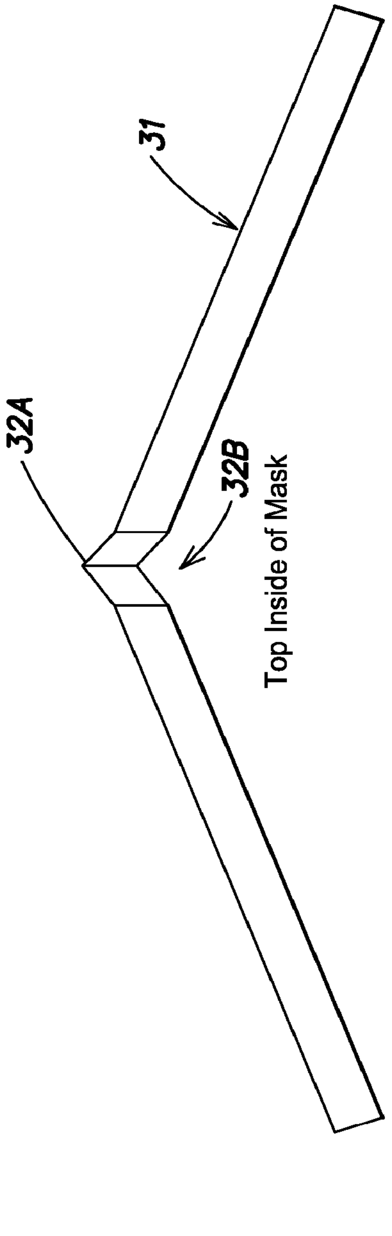
FIG. 2B illustrates an embodiment of a top view of the malleable stiffening member (e.g., metal strip) having a bend portion shown as it would bend further around the nose if the filter mask was unfolded and the user pinched the malleable stiffening member.

FIG. 2B illustrates a top view of the malleable stiffening member 31 having a bend portion shown as it would start to bend around the nose if the filter mask (not shown) was unfolded. The bend portion has a projection, peak, protrusion, elevation or ridge 32A that extends out and is visible on the outside surface of the mask (not shown). The projection increases as the malleable stiffening member 31 is further bent or pinched. The bend portion has a cavity, indentation, recess, crease, or trough 32B on the inside of the mask that is visible on the inside surface of the mask and gets bigger as the malleable stiffening member is further bent, pinched or folded. The stiffening member 31 would have this configuration when attached to or in the unfolded mask. In the embodiment, shown the bend portion, like the malleable stiffening member 31 may be substantially deformable so that a wearer is able to bend or fold the bend portion and/or the malleable stiffening member using two or more fingers when gripping it as it is put around the ridge of the nose.

In some embodiments, the bend is in a vertical direction relative to the one or more pleats. In some embodiments, the bend portion 32 is crimped, bent, creased, folded, or angled toward the inner surface or outer surface of the filter mask by about 1 to 10 degrees or by 0.5 mm to about 50 mm. For example, the crimp can be from 1 mm, 10 mm, 15 mm, 20 mm, 30 mm, 35 mm, 40 mm, 45 mm, 50 mm, 55 mm, 60 mm, or 65 mm.

Securing Means

The filter mask may be attached to the user by a securing means that can attach the mask to the user. For example, the securing means may be a pair of manual tie straps that are wrapped around the head of the user and are connected to one another, or the securing means may be ear loops (28 and 30 in FIG. 1), elastic bands wrapped around the head of the user, a hook and loop type fastener arrangement (e.g. VELCRO® fasteners), or a connection directly attaching the face mask to a hair cap.

In some embodiments, the ear loops (28 and 30 in FIG. 1) can be attached to the inner or outer surface of the mask at upper edges 16 and 18 and lower edges 22 and 26. The attachment points may be in from the edge by, for example, from about ⅛$^{th}$ of an inch to 1 inch. The closer together the ear loops are, the tighter the fit and the mask will reduce gaps and leakage of inhaled and exhaled air. In some embodiments, the loop is positioned so as to be balanced in the wearer's hand, thereby stabilizing the mask for donning.

The loop may be formed from any suitable material, such as an elastic material (e.g. a polymer), inelastic material, a nonwoven, knit, ribbon, cloth, wire, and so forth. As used herein, the term "elastic" refers to the ability of a material to recover its size and shape after deformation. As used herein, the term "inelastic" refers to the inability of a material to recover its size and shape after deformation. In some embodiments, the loop is formed from the same material selected to form the outside surface of the mask. The loop may be bonded or otherwise affixed to the outside surface or inside surface of the mask. Examples of suitable techniques include adhesive bonding, thermal bonding, stitching, and so forth. As used herein, the term "adhesive" refers to the property of any material that allows the material to bond together substrates by surface attachment.

The loop is generally sized and positioned to facilitate gripping by a wearer, both prior to, during, and after donning. The loop 30 may be more or less than about 80 mm (0.08 m) in length as measured from the first end 16 to the second end 22 along the length of the loop. In other embodiments, the loop 30 may be less than about 60 mm (0.06 m) in length. In yet other embodiments, the loop 30 may be less than about 40 mm (0.04 m) in length. Where, in some embodiments, the loop is formed from an elastic material, the loop may have a fully extended length of 200 mm (0.200 m) or more. In some embodiments, the loop is from about 4 to 10 inches in length.

In some embodiments, the loop generally extends inwardly from the outside surface or inside surface a sufficient distance so that the wearer of the mask may grip the loop between two or more fingers of a single hand. In some embodiments, the loop may extend outwardly from the inside or outside surface at least 5 mm (0.005 m). In other embodiments, the loop may extend outwardly from the outside or inside surface at least about 8 mm (0.008 m). In yet other embodiments, the loop may extend outwardly from the outside or inside surface at least about 10 mm (0.01 m) from the outside surface.

Figure 3:
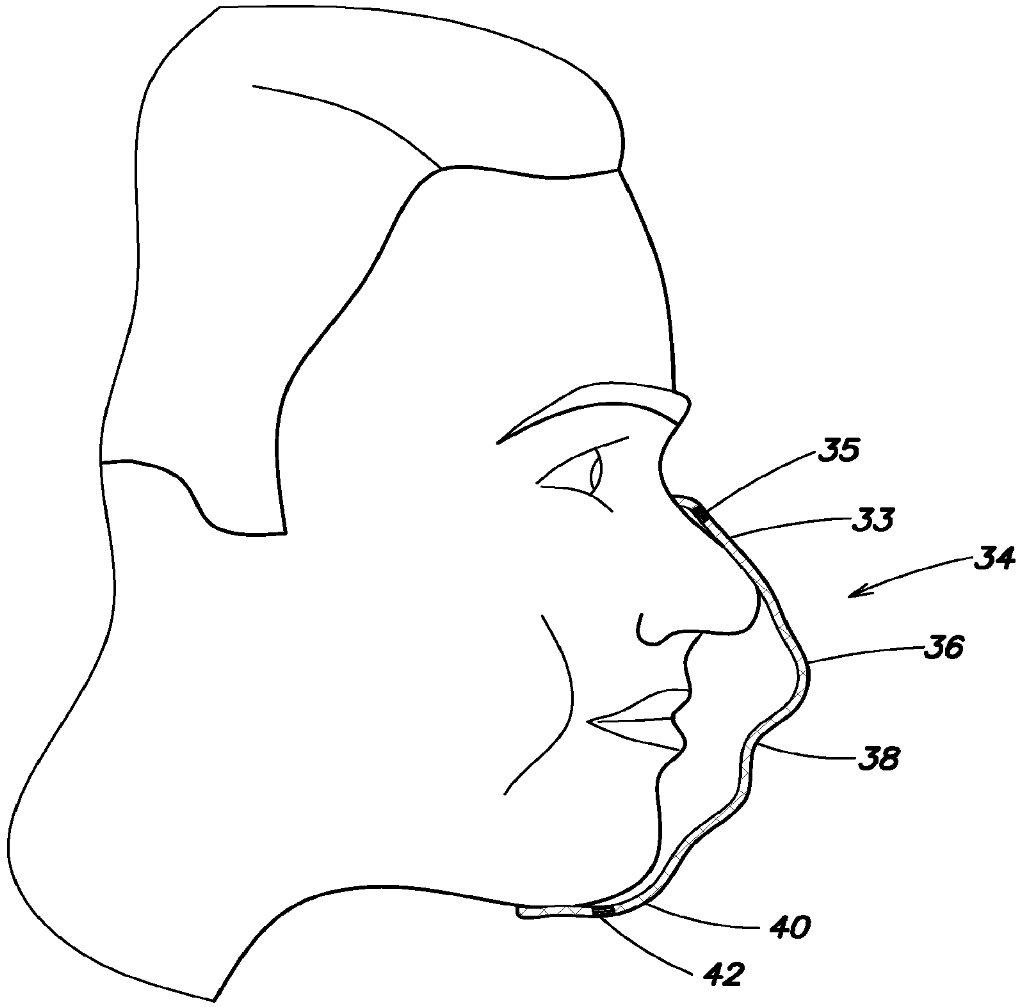
FIG. 3 illustrates a cross-sectional view of an embodiment of a filter mask installed upon a wearer's face.

FIG. 3 illustrates a cross-sectional view of an embodiment of a filter mask in the unfolded position installed upon a wearer's face. The filter mask 34 may have applications in medical, industrial, domestic, or other circumstances. The filter mask 34 is generally configured so as to provide a secure fit which prevents passage of any material between the nostrils and mouth and the surrounding environment except through the filter material 36.

The filter material 36 comprises one or more pleats 38 (shown in the unfolded position). The one or more pleats are disposed between at least the upper, lower, and/or side edges of the mask.

The filter mask 34 comprises in its upper section 33, an upper malleable stiffener 35, which when pinched, folded or twisted pulls the filter material 36 including its top and side edges to be held against the nose and cheeks while the lower malleable stiffener 42 in the lower section 40 of the filter mask, which when pinched, twisted or folded pulls the side and lower edges into the side of the face and lower jaw area to provide a secure, comfortable and custom fit. Furthermore, it can also be seen that the pleat 38 allows the creation of a pocket-like shape or chamber by which the inner surface of the filter material 36 is held tightly against the lower jaw area of the wearer. The upper and lower malleable stiffeners (35 and 42) increase the secure fit formed around the nose and cheek area and the chin and jaw portion of the face of the wearer.

Figure 4:
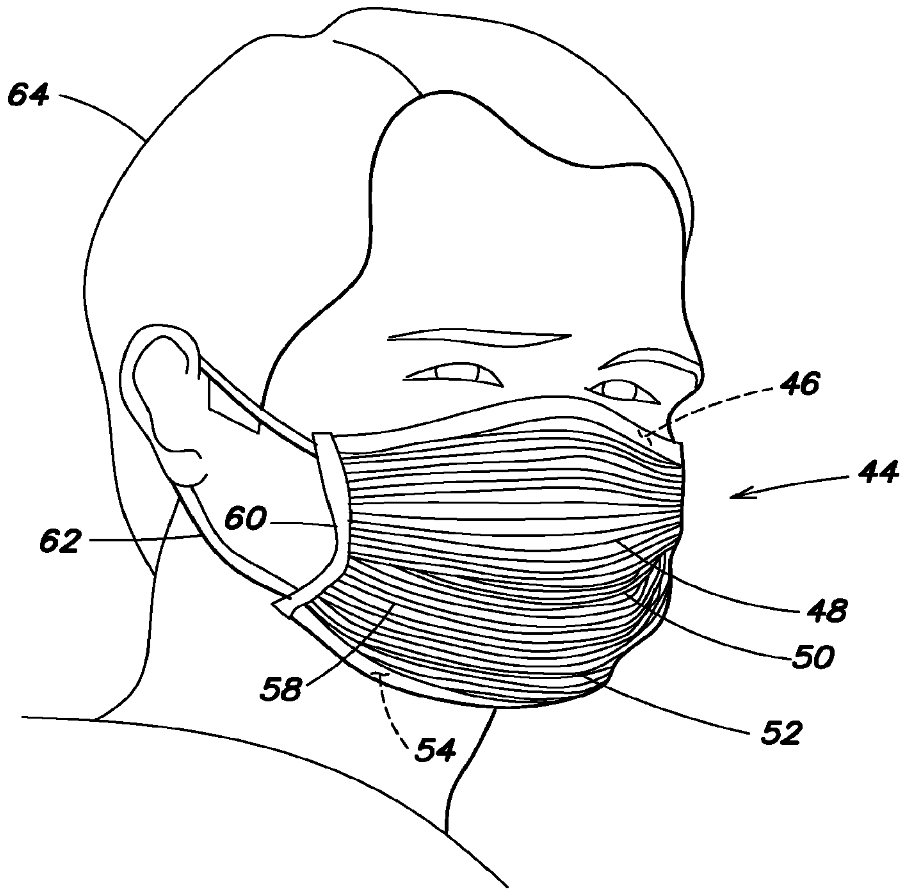
FIG. 4 illustrates a perspective view of an embodiment of a filter mask installed upon a wearer's face.

FIG. 4 illustrates a perspective view of an embodiment of a filter mask 44 installed upon a wearer's face. The outer surface 58 of the filter mask 44 is shown facing the outside environment that the wearer 64 is exposed to. The filter mask 44 is shown in its unfolded position and secured to the wearer's face to provide the secure and comfortable fit by securing the ear loops (one shown as 62) around the wearer's ears. The ear loops are preferably formed of elastic such that they will secure the filter mask 44 in the proper position on the wearer's face. Use of elastic ear loops allows the filter mask 44 to be easily installed by the wearer and avoids the difficulty of tying a string tie behind the head. Furthermore, since the ear loops are elastic, there is not the risk of the ear loops becoming untied at an inopportune moment which accompanies the use of ordinary tie strings. Furthermore, the elasticity of the ear loops may be chosen so as to allow the filter mask 44 to be easily repositioned on the face while only using one hand.

The filter mask 44 comprises one or more pleats (shown in the unfolded position are three pleats that have been unfolded 48, 50 and 52). The one or more pleats are disposed between at least the upper, lower, and/or side edges of the mask. As used herein, the term "pleat" refers to a relatively flat double-fold formed in the filter mask 44 when the filter mask 20 is in the flat storage configuration (as illustrated in FIG. 1). The pleats in the filter material can be any known in the art and include, for example, Z shaped pleats, standard pleats, omega pleats, secondary pleats, reverse pleats or the like.

The one or more pleats are disposed between the upper, lower and side edges (60) of the mask. It will be understood by those of ordinary skill in the art that the mask may have one, two, three, four, five, six, seven, eight or more pleats, each of which can be the same or different sizes and/or shapes.

The filter mask 44 comprises in its upper section, an upper malleable stiffener 46, which when pinched, folded or twisted pulls the filter material including its top and side edges against the nose and cheeks. The filter mask also comprises lower malleable stiffener 54 in the lower section of the filter mask, which when pinched, folded or twisted pulls the side and lower edges into the side of the face and lower jaw area to provide a secure facial fit. Furthermore, it can also be seen that the pleat 48, 50, and 52 allows the creation of a pocket-like shape by which the inner surface of the filter material is held tightly against the lower jaw area of the wearer. The upper and lower malleable stiffeners (46 and 54) are attached to or imbedded in the mask material, typically on or in the inside or outside of the mask. These malleable stiffeners increase the secure fit formed around the nose and cheek area and the chin and jaw portion of the face of the wearer.

By properly positioning the ear loops, the one or more pleats, and pinching, bending, folding or twisting the malleable stiffeners against the nose, cheek, chin and/or jaw areas upon installation of the filter mask, a secure fit is provided not only along the upper and lower malleable stiffeners 46 and 54, but also along the side edges of the filter mask 44 which contact the cheeks. This is due to the effect of the tension exerted because of the cooperation of the pleats, malleable stiffener(s) and the ear loops. Furthermore, the filter mask 44 still allows for normal speech without significant difficulty while maintaining a secure fit.

Figure 5:
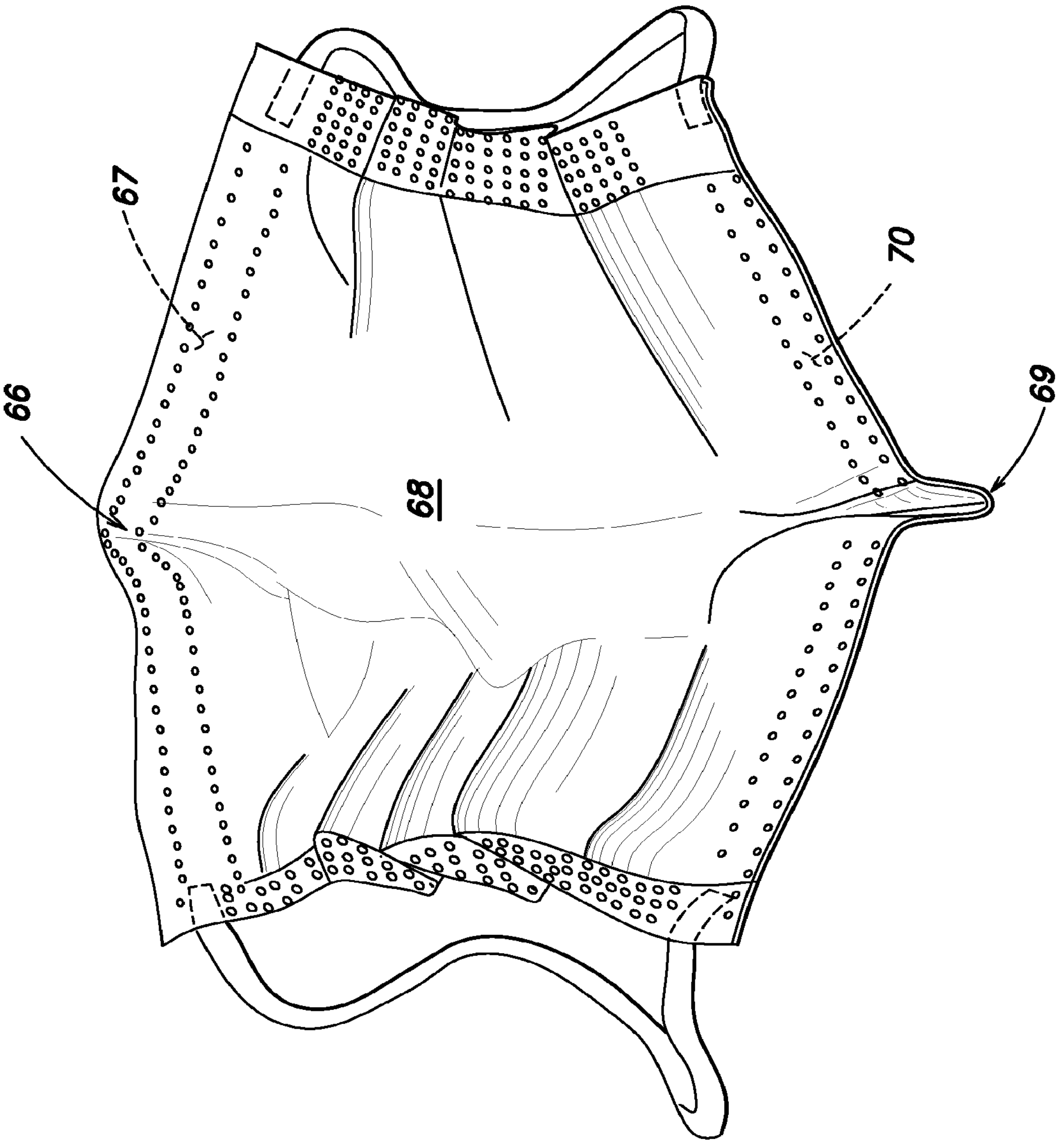
FIG. 5 illustrates an embodiment of the inner surface of a filter mask.

FIG. 5 illustrates an embodiment of the inner surface 68 of a filter mask that the wearer would place against his/her face. The mask is shown in the unfolded or partially unfolded position. The upper malleable stiffener 67 imbedded or attached to the mask has been folded, crimped, pinched, bent, creased, and/or angled around the wearer's nose and/or cheek area and causes a cavity 66 in the filter material that conforms and pulls it closer to a portion of the nose and/or cheek. The lower malleable stiffener 70 imbedded or attached to the mask has been crimped, bent, creased, folded, pinched, and/or angled around or under the wearer's chin and/or jaw area and causes a cavity 69 in the filter material that conforms and pulls it closer to a portion of the wearer's chin and/or jaw area. In some embodiments, the cavity 69 will be located under the chin so that the user can rest it on it. The mask provides a secure and comfortable fit for the user by simply pinching the malleable stiffeners. It will be understood by those of ordinary skill in the art that the cavities in the inside of the mask 66 and 69 can be aligned vertically with each other or be substantially parallel to each other so that projection 66 and 69 line up.

Figure 6:
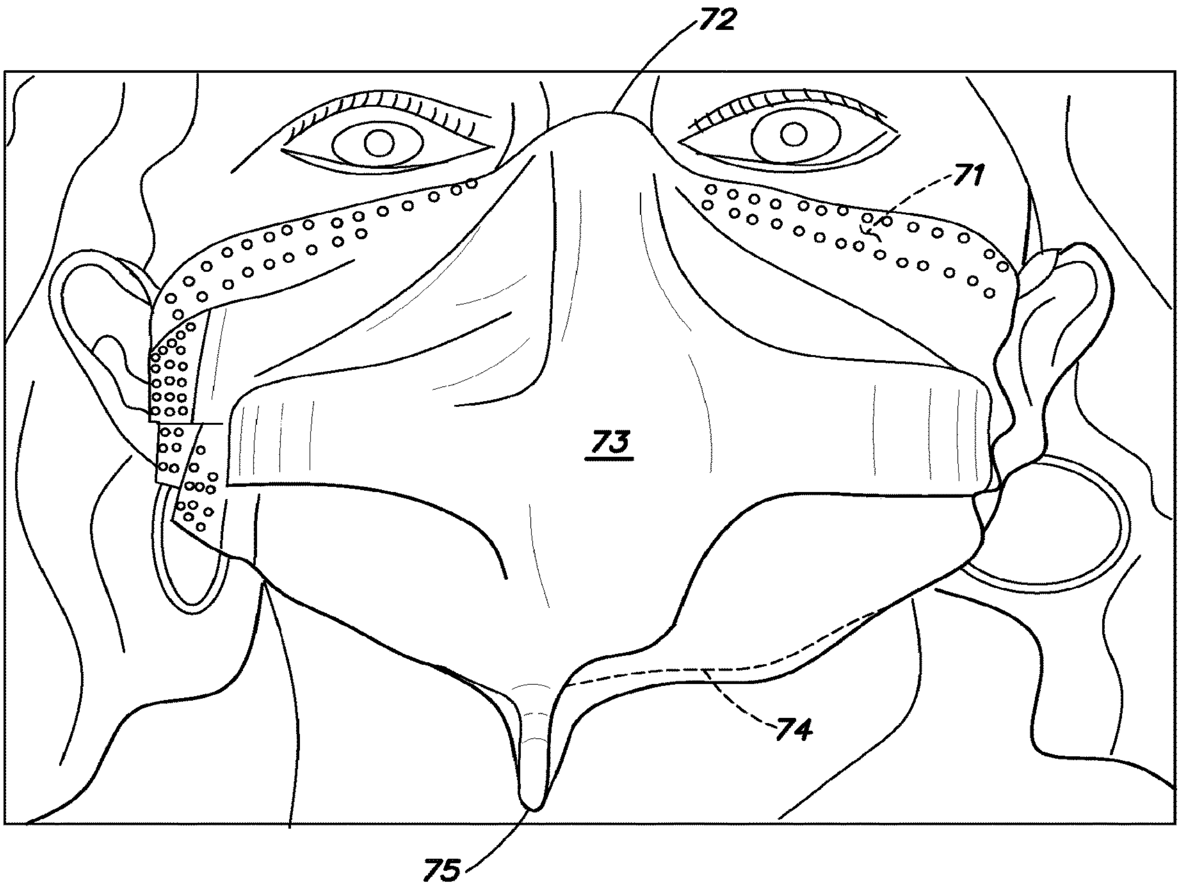
FIG. 6 illustrates an embodiment of the outer surface of the filter mask installed upon a wearer's face.

FIG. 6 illustrates an embodiment of the outer surface 73 of the filter mask installed upon a wearer's face. The mask is shown in the unfolded or partially unfolded position. The upper malleable stiffener 71 imbedded or attached to the mask has been folded, crimped, pinched, bent, creased, and/or angled around the wearer's nose and/or cheek area and causes a projection 72 in the filter material that conforms it to a portion of the nose and/or cheek. The lower malleable stiffener 74 imbedded or attached to the mask has been crimped, bent, creased, folded, pinched, and/or angled around or under the wearer's chin and/or jaw area and causes a projection 75 in the filter material that conforms to a portion of the wearer's chin and/or jaw area. In some embodiments, the projection 75 will be located under the chin so that the user can rest it on it. The mask provides a secure and comfortable fit for the user by simply pinching the malleable stiffeners. In this way, the mask reduces leakage of material around the top, bottom and edges of the masks. It will be understood by those of ordinary skill in the art that the projections in the outside of the mask 72 and 75 can be aligned vertically with each other or be substantially parallel to each other so that projection 72 and 75 line up.

In some embodiments, individuals who wear eyeglasses also are plagued by the problem of fogging of their glasses due to condensation of warn, vapor laden exhaled air on the colder surface of their eyeglasses. Ensuring a secure fit along the upper edge of the filter mask helps to reduce fogging of eyeglasses due to the condensation of vapor laden air.

In some embodiments, for easy grasping, the filter mask may be thermally molded or heat set to increase stiffness. In other embodiments, binder chemicals may be added to the materials prior to formation of the mask. The filter mask can be disposable and/or for single use.

Methods of Making

The filter mask may be formed from a variety of materials and fabrics, such as woven reusable fabrics and nonwoven disposable fabrics or webs. As used herein, the term "nonwoven fabric" or "nonwoven web" or "nonwoven material" means a web having a structure of individual fibers or threads that are randomly interlaid, but not in an identifiable manner or pattern as in a knitted fabric. Nonwoven fabrics or webs have been formed from many processes, for example, meltblowing processes, spunbonding processes, and bonded carded web processes.

As used herein, the term "spunbond" or "spunbond fibers" or "spunbonded fibers" refers to small diameter fibers that are formed by extruding molten thermoplastic material as filaments from a plurality of fine, usually circular capillaries of a spinneret with the diameter of the extruded filaments then being rapidly reduced, for example, as in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, and U.S. Pat. No. 3,542,615 to Dobo et al.

As used herein, the term "meltblown" or "meltblown fibers" means fibers formed by extruding a molten thermoplastic material through a plurality of fine, usually circular, die capillaries as molten threads or filaments into converging high velocity, usually hot, gas (e.g. air) streams that attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin et al.

The filter mask may be formed from a single layer of material or a composite of multiple layers. In the case of multiple layers, the layers are generally positioned in a juxtaposed or surface-to-surface relationship and all or a portion of the layers may be bound to adjacent layers. The multiple layers of a composite may be joined to form a multilayer laminate by various methods, including but not limited to adhesive bonding, thermal bonding, or ultrasonic bonding.

One composite material suitable for use with the present application is a spunbond/meltblown/spunbond (SMS) laminate. An SMS laminate may be made by sequentially depositing onto a moving forming belt first a spunbond fabric layer, then a meltblown fabric layer and last another spunbond layer and then bonding the laminate in a manner described below. Alternatively, the fabric layers may be made individually, collected in rolls, and combined in a separate bonding step. Multilayer laminates may have multiple meltblown layers or multiple spunbond layers in many different configurations and may include materials other than nonwovens. Examples of such other materials include wovens, films, foam/film laminates and combinations thereof, for example, a spunbond/film/spunbond (SFS) laminate. Examples of other composite materials suitable for use in the present invention include, but are not limited to, those described in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., U.S. Pat. No. 4,374,888 to Bornslaeqer, and U.S. Pat. No. 5,188,885 to Timmons et al., which are all incorporated herein by reference.

The filter mask of the present application may include a layer of material, for example, a nonwoven material, suitable for filtration. The filtration material may be made from a meltblown nonwoven web and, in some embodiments, may be subject to electret treating. As used herein, the term "electret" or "electret treating" refers to a treatment that imparts a charge to a dielectric material, such as a polyolefin. The charge includes layers of positive or negative charges trapped at or near the surface of the polymer, or charge clouds stored in the bulk of the polymer. The charge also includes polarization charges that are frozen in alignment of the dipoles of the molecules. Methods of subjecting a material to electret treating are well known by those skilled in the art. These methods include, for example, thermal, liquid-contact, electron beam, and corona discharge methods. One particular technique of subjecting a material to electret treating is disclosed in U.S. Pat. No. 5,401,466, the contents of which are herein incorporated in its entirety by reference. This technique involves subjecting a material to a pair of electrical fields wherein the electrical fields have opposite polarities. Electret treatment results in a charge being applied to the filtration medium that further increases filtration efficiency by drawing particles to be filtered toward the filter by virtue of their electrical charge. Electret treatment can be carried out by a number of different techniques. One technique is described in U.S. Pat. No. 5,401,446 to Tsai and incorporated herein by reference in its entirety. Other methods of electret treatment are known in the art, such as that described in U.S. Pat. No. 4,215,682 to Kubik et al., U.S. Pat. No. 4,375,718 to Wadsworth, U.S. Pat. No. 4,592,815 to Nakao and U.S. Pat. No. 4,874,659 to Ando, incorporated herein by reference in their entirety.

Alternatively, the mask may include a layer of expanded polytetrafluoroethylene (PTFE) membrane for filtration, such as those manufactured by W. L. Gore & Associates. A more complete description of the construction and operation of such materials can be found in U.S. Pat. No. 3,953,566 to Gore and U.S. Pat. No. 4,187,390 to Gore, incorporated herein by reference in their entirety.

In some embodiments, the filter mask comprises one or more layers individually or combined made of medical grade tissue, spun bound polypropylene, cellulose material, meltblown polypropylene, spun bound high density polyethylene, and/or low density polyethylene.

In some embodiments, one or more layers of the mask may be impervious or substantially impervious to liquid (e.g., spun bound polypropylene, and/or meltblown polypropylene layer(s)), which may cause liquid to bead on one or more surfaces or layers of the mask.

In some embodiments, the filter mask can be made by providing the filter material and inserting or attaching the malleable stiffening members to the mask, where at least one malleable stiffening member is partially bent, crimped, creased, folded, and/or angled and attached to or in the nose portion of the mask, either on the inside of the mask or outside of it and then attaching a second malleable stiffening member to the lower portion of the mask for the chin and/or jaw area; and attaching securing members to the mask, either on the inside of the mask or outside of it.

In some embodiments, a method of making a filter mask having a bend portion is provided, the method comprising providing a filter material having an inner surface to be worn against a wearer's face, the filter material comprising at least one pleat for folding and unfolding the filter material such that when folded the filter material assumes a generally flat storage configuration having upper, lower and side edges and such that when unfolded the filter material forms a mask configured to cover the nose and mouth of the wearer, the at least one pleat disposed between at least the upper and lower edges and configured to fit over a chin of the wearer when unfolded; a malleable stiffening member attached to or within the filter material proximate to the upper edge, the malleable stiffening member configured to conform the filter material to at least a nose portion and a cheek portion of the face of the wearer; bending, folding, creasing, crimping, or angling the malleable stiffening member, and inserting it or attaching it to at least the inner surface and the nose portion of the filter mask to indicate at least the inner surface and the nose portion of the filter mask; and attaching a securing means to the filter material.

In some embodiments, the bend portion is pinched, crimped, bent, creased, folded, or angled toward the inner surface or outer surface of the filter mask by about 1 to 10 degrees or by 1 mm to about 20 mm by hand or machine, before, during or after it is attached or imbedded in the mask. These include crimping machines having stops, posts, or the like that allow the bend portion to be formed.

In some embodiments, the filter mask of the current application can be used with an external filter in the environment, ventilation system (e.g., intake and/or exhaust ventilation), negative pressure rooms or the like. For example, a negative pressure room, in addition to the filter mask worn on the user and/or receiver, may prevent further contamination of individuals (e.g., patients, healthcare workers, visitors, etc.). A negative pressure room includes a ventilation system designed so that air flows from the corridors, or any adjacent area, into the negative pressure room, reducing the risk that contaminated air escapes from the negative pressure room to other parts of the facility. The air in the negative pressure room, may be filtered before it is exhausted.

Having now generally described the invention, the same may be more readily understood through the following reference to the following examples, which are provided by way of illustration and are not intended to limit the present invention unless specified.

EXAMPLES

Example 1

This study addresses the effects of improved mask fit, through both improved mannequin breathing models as well as through various mask fit methods, i.e. tight mask, natural fitting mask, and/or SecureFit mask. The SecureFit mask of the current application contains a malleable stiffening member (e.g., metal strip) in the nose portion and the chin portion of the filter mask, the user can pinch the malleable stiffening members to obtain a secure and comfortable fit to the mask and, therefore, have the mask custom fit to his/her face. SecureFit achieves better results than a Standard mask "natural fit" (SMnat) while negating the need for an unnaturally (and typically unachievable) tight fit (TSM). When the source wears the mask of the current application (SecureFit) the risk of exposure to the receiver decreases.

The source includes a subject who generates or expels aerosol in the course of breathing, coughing, sneezing, etc. A receiver includes a subject who inhales or receives such aerosol on the surface of the face and/or body. The aerosol includes a suspension of dry or liquid microscopic particles, which can include, for example, bacteria, fungi, yeast, molds and/or viruses, or the like. These are contaminants of the aerosol.

It was found that the TSM worn on the receiver of the aerosol from the source protects the wearer better than SMnat. On the source, the TSM captures more particles from the wearer (source) than the SMnat. This test was done under negative pressure room simulation. The TSM and the SF protect the receiver (wearer) with tighter confidence intervals than do the SMnat. SF unexpectedly captures/contains more particles from the wearer (source) than either the TSM or the SMnat.

Protection from Inhaled Infectious Aerosols: Importance of Source Control

Purpose: To test the effects of improved fit and study the importance of room ventilation on source control protection by comparing extraction and air circulation models.

Figure 11A:
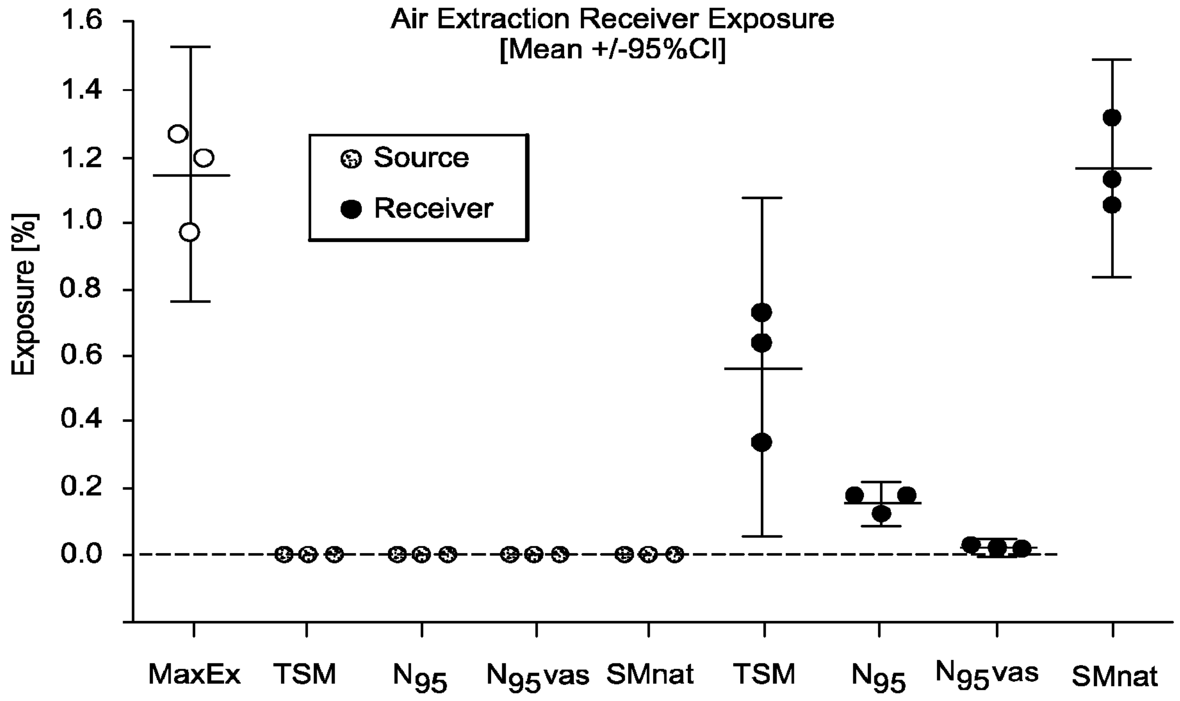
Figure 11B:
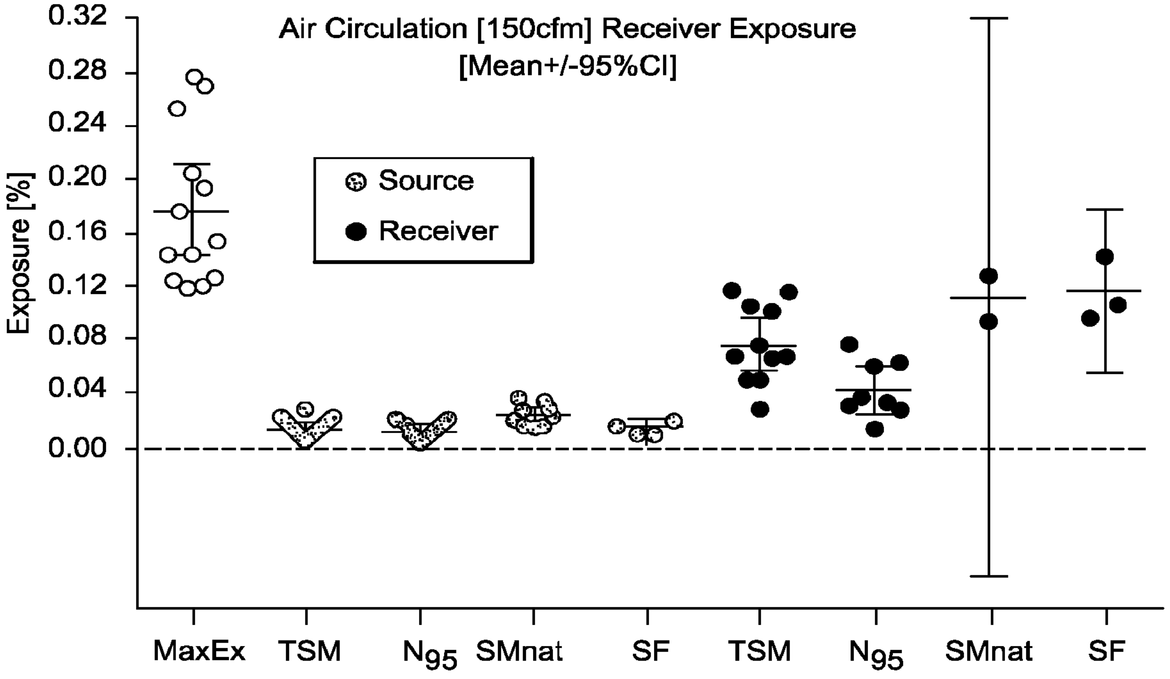
Figure 11C:
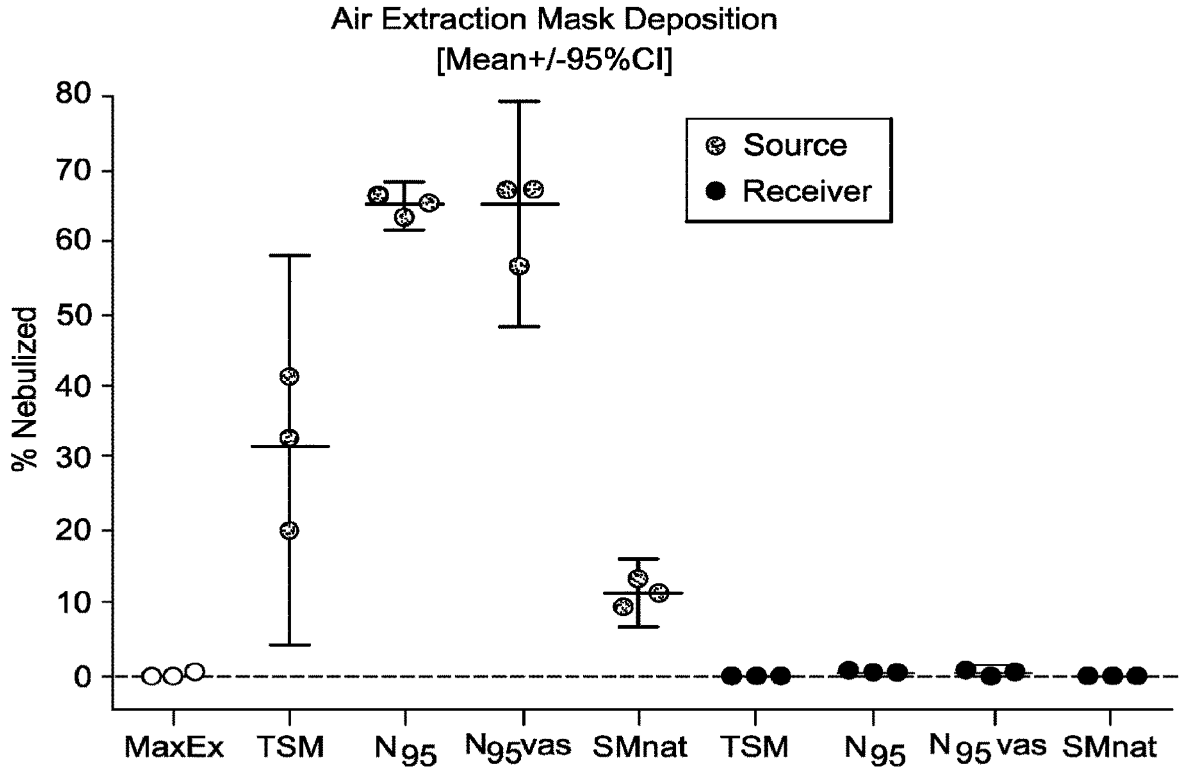
Figure 11D:
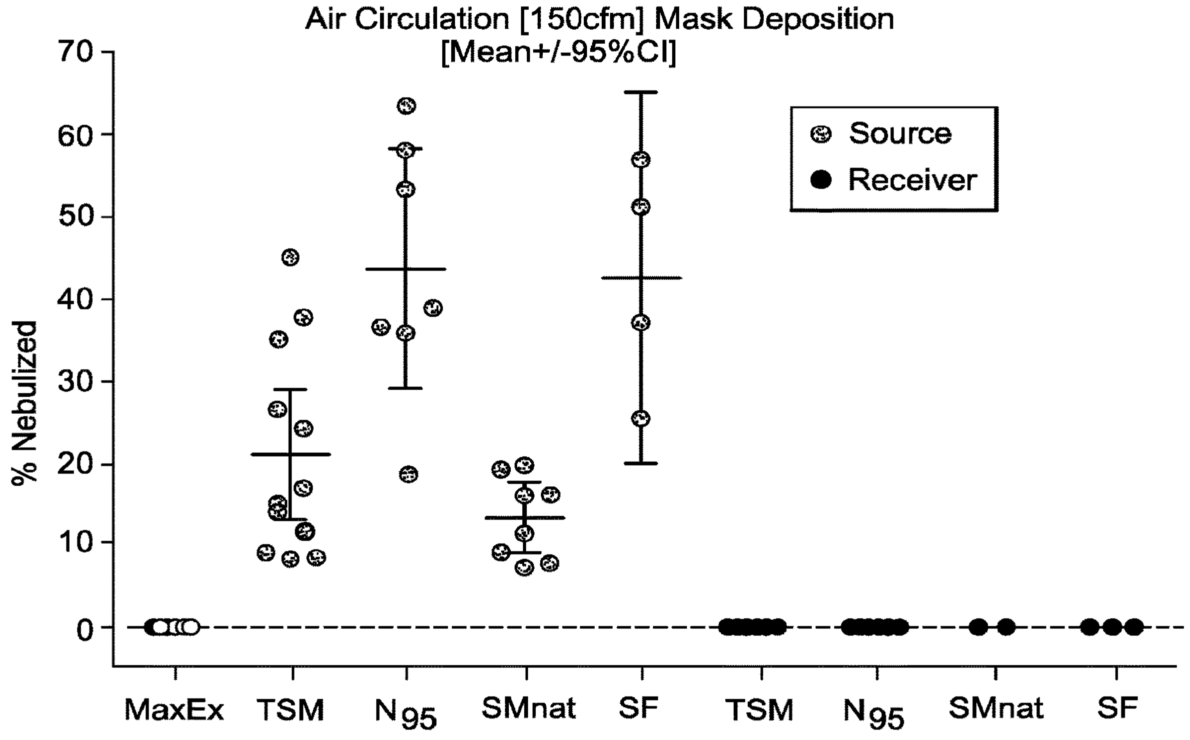

Methods: Two mannequin heads were placed in a chamber allowing 6 air extractions/hour to simulate patient (source) and health care worker (receiver) interaction. The source exhaled radioactive aerosols and a filter was attached to the receiver to quantify inhaled exposure defined as % nebulized aerosol. The mannequin heads were ventilated using tidal breathing patterns. N95 respirators and surgical masks were tested on both. Experiments were repeated in a chamber with circulating airflow at 150 cfm. It was found that placing any mask on the head significantly reduces receiver exposure. On the receiver, only Vaseline sealed N95 respirators come close (FIG. 11A). Maximum exposure was reduced in air circulation model. Surgical masks on the source can be as effective as receiver protection with the N95 masks (FIG. 11B). Mask filtration at the source N95>TSM>SMnat, reduce exposure and are not simple function of mask filtration (FIG. 11C). Wearing the mask is significant only when the source wears the mask. Receiver filtration is less important as compared to when a source wears a mask (FIG. 11D).

Conclusion:

Changing the fit of masks on the source confirmed that source control protection remained superior to receiver control protection in the setting of air extraction. Source control protection is enhanced by environmental air extraction (e.g., negative pressure, vented air, filtered air, etc.) because particles are deflected away from the receiver and removed from the environment. In the standard room air mixing model, a surgical mask on the source was found to offer comparable protection to the N95 respirator on the receiver.

Example 2

Figure 10:
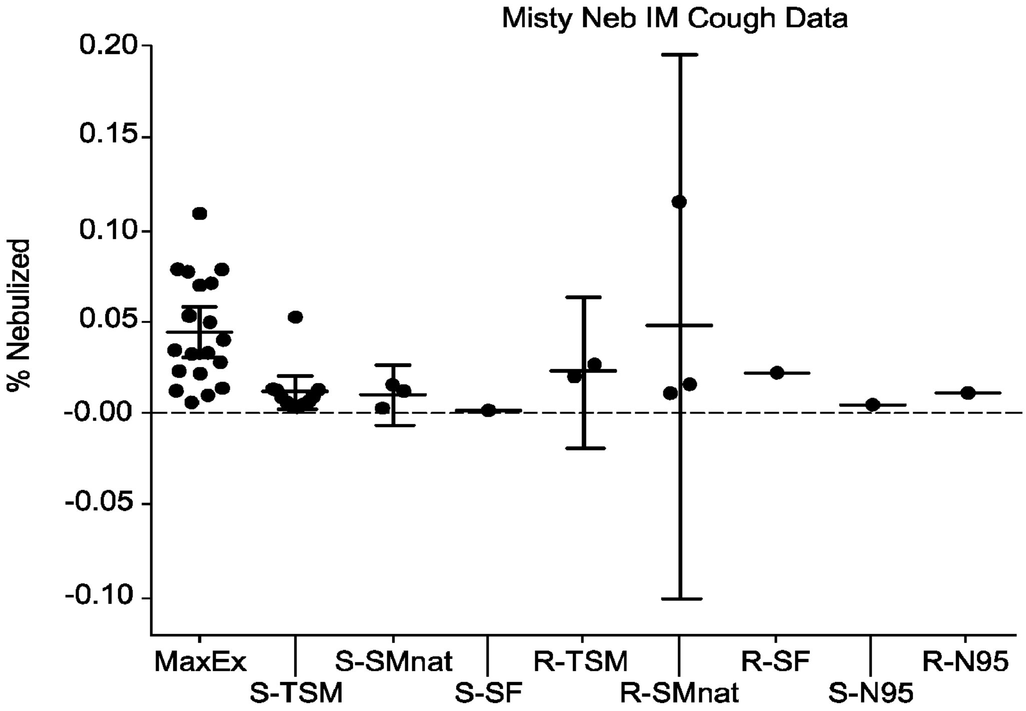

When no masks are used on either source or receiver, maximum exposure (MaxEx) to receiver is achieved. When the source wears a mask (left side of FIG. 10), exposure to the receiver is reduced. That exposure to receiver is the least when the source wears a SecureFit mask (S-SF). Exposure is greatest when the source wears a standard mask (S-SMnat). When the receiver wears a mask, the greatest exposure results from the standard surgical mask (R-SMnat). SecureFit (R-SF) provides equivalent protection to the Tight Mask (R-TSM) when worn by the receiver. These results are illustrated in FIG. 10 (Misty Neb IM Cough Data).

Example 3

Figure 7:
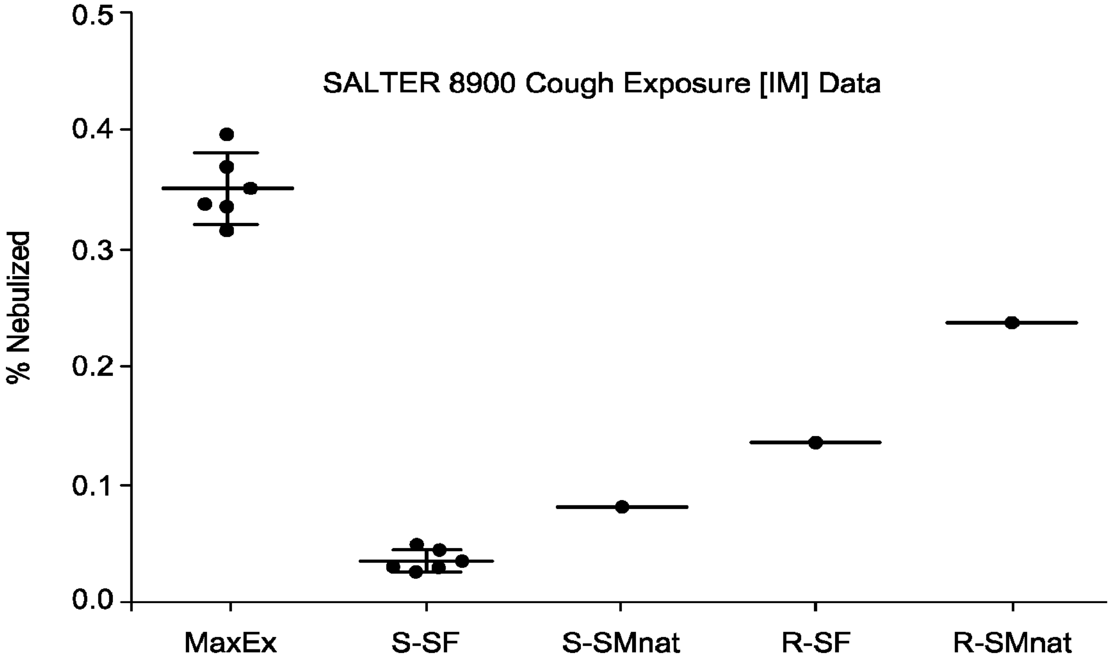
FIGS. 7-11D are graphic illustrations of % nebulized aerosol and the exposure to a source (S) or receiver (R) wearing no mask or wearing different types of masks including one embodiment of the mask of the current application (SF).
Figure 8:
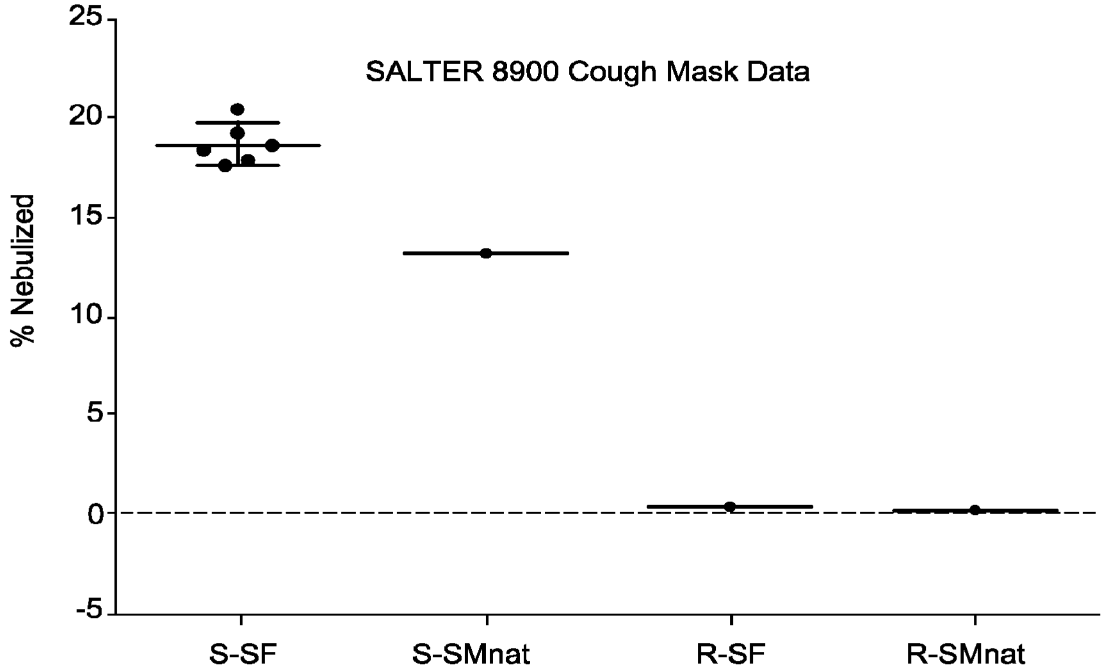
Figure 9:
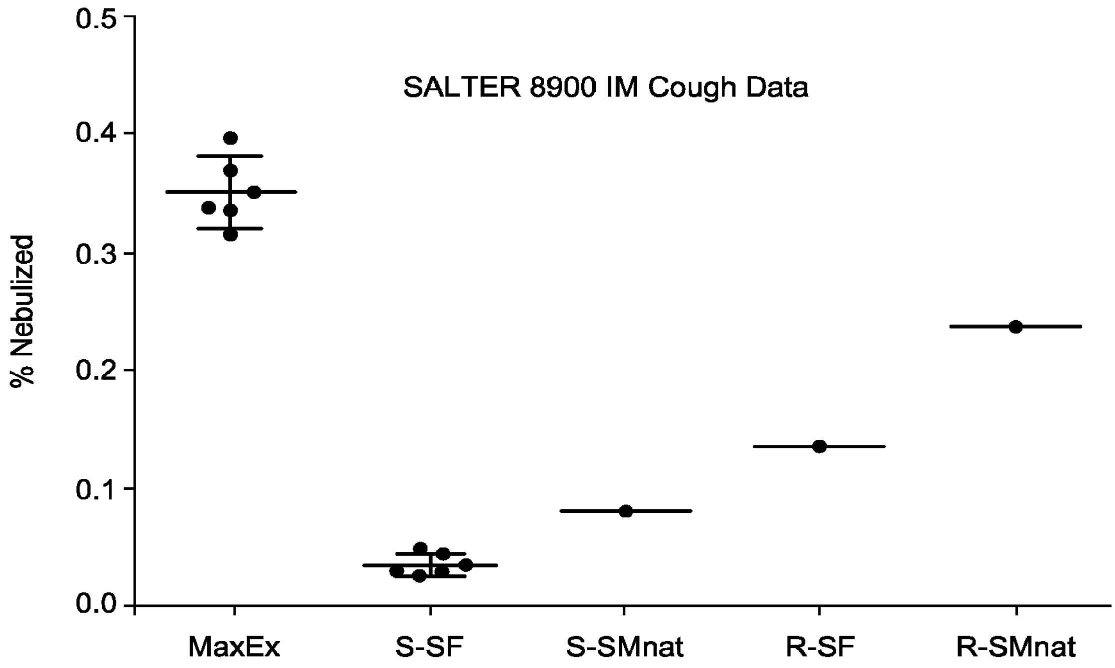

When no masks are worn on either source or receiver, maximum exposure (MaxEx) to receiver is achieved. When masks are worn at the source, SecureFit results in less exposure to the receiver than the Standard Mask (S-SMnat). When masks are worn by the receiver, SecureFit (R-SF) results in less exposure to wearer (receiver) than does a Standard Mask (R-SMnat). The results are shown in FIGS. 7-9. In FIG. 8, SecureFit captures or confines more of the exhaled aerosolized particles, which gives further protection to the user and the receiver.

In some embodiments, the filter mask is worn by a source and prevents contaminants from infecting a receiver who is not wearing a filter mask. In some embodiments, the filter mask is worn by a source and prevents contaminants from infecting a receiver who is also wearing a filter mask.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

What is claimed is:

1. A filter mask comprising: a filter material having an inner surface to be worn against a wearer's face, and an outer surface, the filter material comprising at least one pleat for folding and unfolding the filter material such that when folded the filter material assumes a flat storage configuration having upper, lower and side edges; a first malleable stiffening member within the filter material along the upper edge for conforming to the wearer's nose; a second malleable stiffening member within the filter material along the lower edge such that the second malleable stiffening member is located between a bottommost pleat of the at least one pleat and the lower edge, and the second malleable stiffening member having a non-conforming portion configured to be creased to form a projection pointing away from the wearer's face and under a chin of the wearer, wherein the second malleable stiffening member has a first conforming portion adjacent to a first creased end of the non-conforming portion, and a second conforming portion adjacent to a second creased end of the non-conforming portion such that the non-conforming portion is disposed between the first conforming portion and the second conforming portion, the first conforming portion and the second conforming portion configured to conform to the wearer's face, wherein the non-conforming portion comprises a peak such that the first creased end, the second creased end and the peak together form the projection having an acute angle; and a means for securing the filter material to the wearer's face; wherein longitudinal sides of the projection are configured to extend transversely to the chin when the mask is worn.

2. A method of wearing a filter mask, the method comprising: providing the filter mask of claim 1 to the wearer; conforming the first malleable stiffening member to at least a nose portion and a check portion of the face of the wearer; bending, pinching or folding the first malleable stiffening member of the filter mask; conforming the second malleable stiffening member to at least a chin portion and a jaw portion of the face of the wearer; and bending, pinching or folding the second malleable stiffening member so as to form the projection pointing away from the wearer's face.

3. A method of wearing a filter mask according to claim 2, wherein the wearer is a source, and the filter mask prevents contaminants from infecting a receiver who is not wearing a filter mask.

4. A method of wearing a filter mask according to claim 2, wherein the wearer is a source, and the filter mask prevents contaminants from infecting a receiver who is also wearing a filter mask.

5. A filter mask according to claim 1, wherein the means for securing comprises a pair of ear loops attached to the outer surface.

6. A filter mask according to claim 5, wherein the pair of ear loops are formed of an elastic material.

7. A filter mask according to claim 1, wherein the filter material comprises an outer layer, an inner layer and a middle layer of a material having a high filtration efficiency.

8. A filter mask according to claim 1, wherein the first malleable stiffening member and the second malleable stiffening member are embedded within the filter material.

9. A filter mask according to claim 1, wherein the first malleable stiffening member has a length longer than the second malleable stiffening member.

10. A filter mask comprising: a filter material comprising upper, lower and side edges and at least one pleat for folding and unfolding the filter material; a first malleable stiffening member within the filter material along the upper edge for conforming to a wearer's nose, the first malleable stiffening member being located between an uppermost pleat of the at least one pleat and the upper edge; a second malleable stiffening member within the filter material along the lower edge of the filter material such that the second malleable stiffening member is located between a bottommost pleat of the at least one pleat and the lower edge, and the second malleable stiffening member having a non-conforming portion configured to be creased to form a projection, wherein the first malleable stiffening member has a length longer than the second malleable stiffening member, wherein the second malleable stiffening member has a first conforming portion adjacent to a first creased end of the non-conforming portion, and a second conforming portion adjacent to a second creased end of the non-conforming portion such that the non-conforming portion is disposed between the first conforming portion and the second conforming portion, the first conforming portion and the second conforming portion configured to conform to the wearer's face, wherein the non-conforming portion comprises a peak such that the first creased end, the second creased end and the peak together form the projection having an acute angle; wherein longitudinal sides of the projection are configured to extend transversely to the chin when the mask is worn.

11. A filter mask according to claim 10, wherein the filter mask further comprises a means for securing the filter material to the wearer's face, the means for securing comprising a pair of ear loops attached to said filter material.

12. A filter mask according to claim 11, wherein the pair of ear loops are formed of an elastic material.

13. A filter mask according to claim 10, wherein the filter material comprises an outer layer, an inner layer and a middle layer of a material having a high filtration efficiency.

14. A filter mask according to claim 10, wherein the first malleable stiffening member and the second malleable stiffening member are embedded within the filter material.

15. A method of wearing a filter mask, the method comprising: providing the filter mask of claim 10 to the wearer; conforming the first malleable stiffening member to at least a nose portion and a cheek portion of the face of the wearer; bending or pinching the first malleable stiffening member of the filter mask; conforming the second malleable stiffening member to at least a chin portion and a jaw portion of the face of the wearer; and bending or pinching the second malleable stiffening member so as to form the projection under the chin of the wearer, and pointing away from the wearer's face to secure the filter mask to the wearer's face.

16. A filter mask comprising: a filter material comprising upper, lower and side edges and at least one pleat for folding and unfolding the filter material; a first malleable stiffening member within the filter material along the upper edge for conforming to a wearer's nose, the first malleable stiffening member being located between an uppermost pleat of the at least one pleat and the upper edge, the first malleable stiffening member extending in a direction parallel to the at least one pleat and configured to conform the filter material to at least a nose portion and a cheek portion of the face of the wearer and having a first portion which is bent creased to conform to the nose; a second malleable stiffening member within the filter material along the lower edge such that the second malleable stiffening member is located between a bottommost pleat of the at least one pleat and the lower edge, the second malleable stiffening member extending in the direction parallel to the at least one pleat and having a second portion which is creased at a smaller angle than the first portion of the first malleable stiffening member, wherein the first malleable stiffening member has a length longer than the second malleable stiffening member, and the second malleable stiffening member having a non-conforming portion configured to be pinched or folded to form a projection under a chin of the wearer, wherein the second malleable stiffening member has a first conforming portion adjacent to a first creased end of the non-conforming portion, and a second conforming portion adjacent to a second creased end of the non-conforming portion such that the non-conforming portion is disposed between the first conforming portion and the second conforming portion, the first conforming portion and the second conforming portion configured to conform to the wearer's face, wherein the non-conforming portion comprises a peak such that the first creased end, the second creased end and the peak together form the projection having an acute angle; wherein longitudinal sides of the projection are configured to extend transversely to the chin when the mask is worn.

* * * * *